Jan. 2, 1923.                          1,440,560
J. W. SHARP.
ANIMAL TRAP.
FILED JULY 17, 1922.
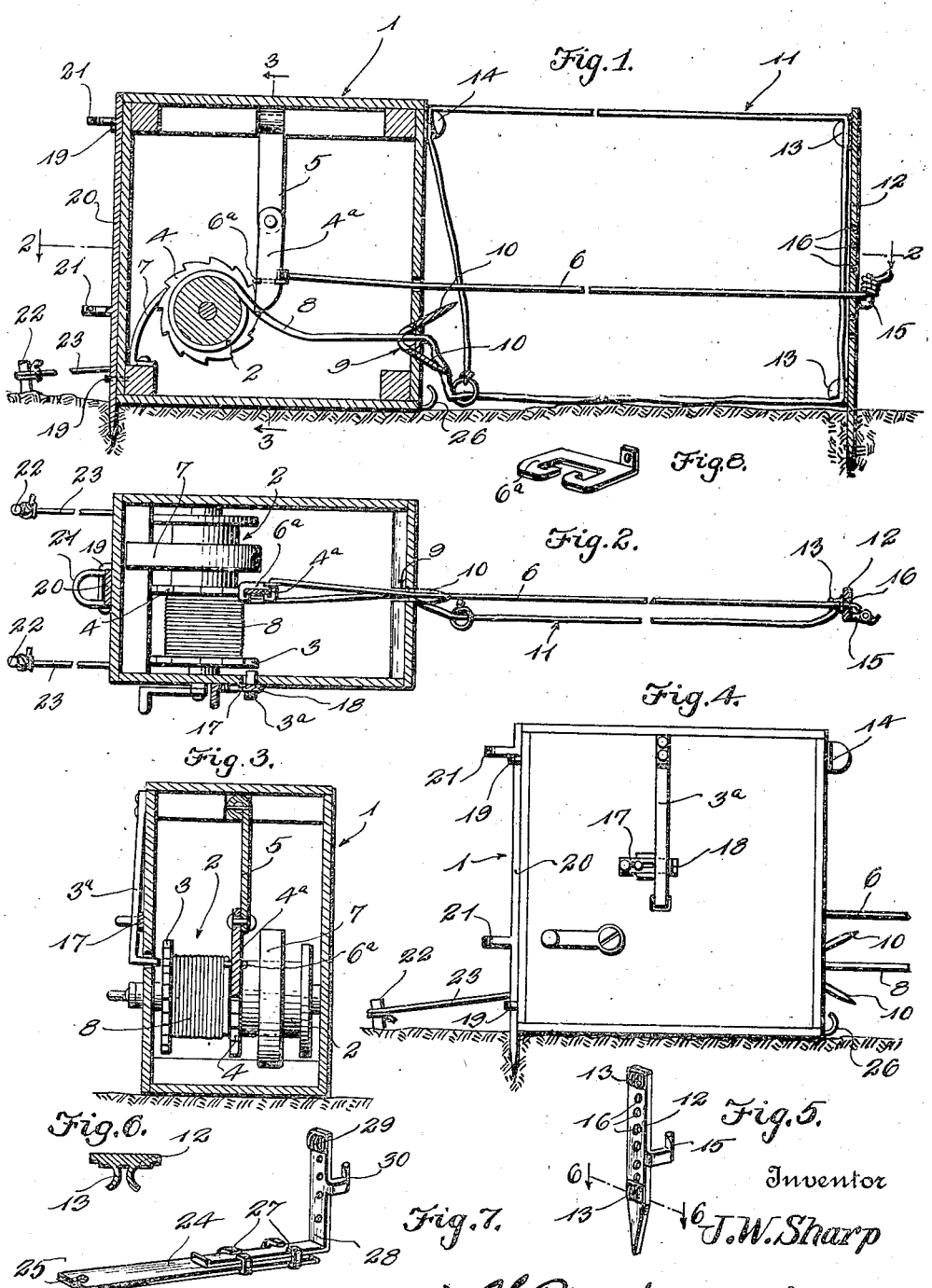

Patented Jan. 2, 1923.

1,440,560

UNITED STATES PATENT OFFICE.

JOHN W. SHARP, OF ESTICO, ARKANSAS.

ANIMAL TRAP.

Application filed July 17, 1922. Serial No. 575,483.

*To all whom it may concern:*

Be it known that I, JOHN W. SHARP, a citizen of the United States, residing at Estico, in the county of Jackson and State of Arkansas, have invented certain new and useful Improvements in Animal Traps; and I do declare the following to be a full, clear, and exact description of the invention, such as will enable others skilled in the art to which it appertains to make and use the same.

This invention relates to an improved animal trap of the type embodying a flexible element having a noose for ensnaring and securely holding an animal.

The principal object of the invention is to provide a trap wherein means is provided for positioning the noose in a vertical position, whereby to permit it to more readily encircle the animal's body than when lying flat upon the ground as usual.

More specifically, it is another object of the invention to provide a trap of the above type wherein the flexible element is wrapped on a spring wound drum which is released for action by novel animal actuated means.

A further object of the invention is to provide an animal trap of this class embodying pointed spurs against which the animal is drawn and securely held through the action of the ensnaring element and spring actuated means therefor.

Other objects and advantages of the invention will be apparent during the course of the following description.

In the accompanying drawings forming a part of this specification and in which like numerals are employed to designate like parts throughout the same:

Figure 1 is a vertical section, with parts in elevation, of a trap constructed in accordance with this invention.

Figure 2 is a horizontal section taken on the line 2—2 of Figure 1.

Figure 3 is a vertical transverse section on the line 3—3 of Figure 1.

Figure 4 is a side elevation of the box showing the construction of the locking means for the drum.

Figure 5 is a detail perspective view of the noose supporting bar.

Figure 6 is a transverse section taken on the line 6—6 of Figure 5.

Figure 7 is a perspective view of a slightly modified form of noose supporting member.

Figure 8 is a perspective view of the connecting member which connects the trip wire with the releasing pawl for the ratchet.

Specifically described, the reference character 1 designates generally a box in which a drum or the like 2 is rotatably mounted. On one end, the drum is provided with a ratchet 3 with which the laterally directed free end or finger of a manually controlled resilient locking device $3^a$ co-acts. Intermediate its ends, the drum is provided with a second ratchet 4 with which a locking pawl $4^a$ co-acts, this pawl being pivotally mounted on the lower end of a pivoted supporting strip 5. Attention is here directed to the fact that the pawl just mentioned has movement in two directions, that is to and from the teeth of the ratchet and at right angles thereto. Hence, a very slight movement of the trip wire will serve to disengage it from the ratchet to permit rotation of the aforesaid drum. A trip wire or the like 6 is connected with this pawl $4^a$ and serves to disengage it from the ratchet as to be hereinafter set forth. It is to be noted that this wire has a special bracket member $6^a$ attached to its inner end and this bracket member is so designed that it can be detachably connected to the pawl. Hence, when a "catch" is made and the animal in trying to escape strikes the wire, this wire will become disconnected from the pawl and will prevent breakage of parts, as might otherwise occur. Proceeding, a flat spring 7 acts on the drum to rotate it in a direction to exert a push against the pawl $4^a$ so that when it is engaged with the ratchet 4, it will be held in this position until the release wire is actuated by the animal. As usual, a hand-crank $7^a$ is employed for rotating the shaft on which the drum is mounted to wind the spring on the latter.

As before indicated, a flexible element such as a rope 8 is wound upon the drum between the two ratchet members 3 and 4, and the free end of this rope extends through an opening in the bracket 9 which is arranged on the front of the box as shown. It may be conveniently stated here that this bracket is equipped with diverging pointed spurs 10 against which the animal is designed to be drawn and securely held until released by the trapper. As is usual, the rope is formed on its free outer end with a noose 11 for ensnaring the animal. As before indicated, it is desirable to maintain this noose in a vertical position so as to permit it to be more readily engaged with the animal. For the purpose of holding the noose in this position, I preferably employ a bar 12 which is adapted to have its lower pointed end driven into the ground at a spaced point from the front of the aforesaid box, this bar being equipped on its rear side with spaced resilient jaws 13 which are intended to releasably grip that portion of the noose which is disposed alongside of the rear face of the aforesaid bar 12. To act in conjunction with these jaws 13, other springs jaws 14 are provided on the front side of the aforesaid box and these co-act with the noose in the manner clearly disclosed in Figure 1. Referring again to the bar 12, it will be seen that this is equipped with an angular part 15 around which the front or free end of the aforesaid trip wire 6 is wrapped. This rod is also equipped with a plurality of close vertically spaced apertures 16 through which the trip wire may be selectively passed.

It is understood that suitable means is to be provided for permitting rotation of the spring wound drum when the trap is set for operation as indicated in Figure 1. To permit this end to be accomplished, the aforesaid spring member 3ª should be disengaged from its ratchet 3 at this time. Of course any suitable means may be provided for accomplishing this result, but I simply prefer to employ a slotted plate 17 which is slidably mounted on one side of the aforesaid box in a position to permit it to be forced between the box and the member 3ª. The free end of this plate 17 is beveled slightly as indicated at 18 to permit it to be easily moved to operative position.

In practice, the box will be anchored to the ground so as to prevent it from being carried off by the animal after it is trapped. Any suitable means may be employed for holding the box to the ground. In the drawings, I have shown staples 19 driven into the rear side of the box and a strip 20 is slidable through these staples, the lower end of the strip being pointed and adapted to be embedded in the ground. For convenience of operation, this strip is equipped with handles 21. If desirable, stakes 22 can be driven into the ground and flexible elements 23 can be connected therewith and with the box to hold the latter in place. The construction of the trap so far described is designed for "long catches" that is, the noose is adapted to be of considerable size and the supporting post or bar 12 is intended to be placed at a considerable distance from the box. For "short catches" however I contemplate substituting for the post 12, a slightly modified part which serves in the same manner. This part is preferably constructed as shown in Figure 7. By directing attention to this figure it will be seen that the modified detail comprises a plate 24 having an aperture 25 at its inner end adapted to engage with the hook 26 on the front of the box. This plate 24 is equipped at its opposite end with spaced guide clips 27 through which the horizontally disposed part of a right angular rope support 28 is slidably received. This rope support 28 is equipped, like the first named supporting post 12, with spring jaws 29 for releasably gripping the rope and with a trip-wire anchor 30. Any suitable co-acting means between the part 28 and 24 may be employed for holding them together and for limiting their relative sliding movement. It is obvious that when the modified form of noose support is used, the noose will be considerably smaller than that shown in Figure 1.

Assuming that the parts are in the relative position disclosed in Figure 1, it will be seen that in case the animal approaches the noose 11 of the entrapping rope and engages the trip-wire 6 the pawl 4ª will become disengaged from the ratchet 4 and will permit rotation of the drum 2 due to the action of the spring 7. The spring is so arranged as to rotate the drum in the direction to wind the rope thereon. Hence, the noose is quickly disengaged from the clip or jaws 13 and 14 and is caused to encircle the animal's body. Due to the action of the spring, the rope will be wound on the drum until the animal is drawn against the spurs 10 and securely held until released by the trapper. It is of course understood that before the drum is permitted to rotate the laterally directed end of the locking member 3ª must be disengaged from the ratchet 3, and to accomplish this result, it is only necessary to force the slotted plate 17 beneath the member as shown in Figure 4. The inherent resiliency of this member 3ª serves to automatically return to its normal operative position when the plate is retracted.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. An animal trap comprising a flexible trapping element having a noose for encircling the animal's body, a box, means in said box for drawing said noose around the animal and for drawing the animal toward the box, and a post arranged in spaced relation from said box and having means engaging a portion of the noose to hold it in a vertical position.

2. An animal trap including a flexible trapping element having a noose for encircling the animal's body, and spaced uprights having clips for engaging portions of the noose to maintain it in a vertical position so long as the trap is set.

3. An animal trap embodying a box, a spring-wound drum arranged therein and having a ratchet, a pivoted supporting strip arranged in the box, a pawl pivoted on the lower end thereof, said pawl being pivoted on an axis transverse to that of said supporting strip and engaged with said ratchet, and an animal actuated release connected with said pawl.

4. An animal trap including a drum on which a trapping element is designed to be wound, said drum being equipped with a ratchet, a releasing pawl engaged with said ratchet to hold the drum against rotation, and a trip wire having detachable connection at one end with said pawl.

5. An animal trap embodying a pivoted releasing pawl, a trip wire to be actuated by the animal, and a bracket carried by the inner end of said wire, said bracket being detachably connected with said pawl.

6. An animal trap comprising a box, a drum rotatable in said box, ratchets fixed to said drum, a spring for rotating said drum, a pivoted pawl for co-action with one of said ratchets, animal actuated trip means for releasing said pawl, a manually released pawl cooperative with the other ratchet, a flexible element wound on said drum and having a noose for ensnaring the animal, spurs mounted on said box in a position to permit the animal to be drawn against them when the flexible element is wound on said drum, and a post adapted to be embedded in the ground at a spaced point from said box, said post being provided with means engaging a portion of a noose.

In testimony whereof I have hereunto set my hand.

JOHN W. X SHARP.
his    mark

Witness to mark:
JAS. G. DENTON.